United States Patent
Lonvick et al.

(10) Patent No.: US 9,483,067 B2
(45) Date of Patent: Nov. 1, 2016

(54) CONTROLLING INTELLIGENT POWERED DEVICES

(71) Applicant: Cisco Technology, Inc., San Jose, CA (US)

(72) Inventors: Christopher Martin Lonvick, San Jose, CA (US); Charles Duffy, Nesconset, NY (US); Luis Orlando Suau, Davie, FL (US); Donald Schriner, Fishers, IN (US); Matthew A. Laherty, Bloomington, IN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 277 days.

(21) Appl. No.: 14/256,445

(22) Filed: Apr. 18, 2014

(65) Prior Publication Data
US 2015/0301544 A1    Oct. 22, 2015

(51) Int. Cl.
| | | |
|---|---|---|
| *G06F 1/26* | (2006.01) | |
| *G05F 1/66* | (2006.01) | |
| *G05B 15/02* | (2006.01) | |
| *H04L 29/08* | (2006.01) | |

(52) U.S. Cl.
CPC .............. *G05F 1/66* (2013.01); *G05B 15/02* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2007/0273307 A1 | 11/2007 | Westrick et al. | |
| 2008/0183307 A1* | 7/2008 | Clayton | G05B 19/042 700/8 |
| 2010/0134042 A1 | 6/2010 | Willaert et al. | |
| 2013/0093332 A1 | 4/2013 | Lee et al. | |
| 2014/0232299 A1* | 8/2014 | Wang | H04L 12/10 315/362 |

OTHER PUBLICATIONS

SUCIU, "international Search Report and Written Opinion issued in International Application No. PCT/US2015/023823,", Jul. 10, 2015, 1-9.

* cited by examiner

*Primary Examiner* — Paul Yanchus, III
(74) *Attorney, Agent, or Firm* — Johnson, Marcou & Isaacs, LLC

(57) ABSTRACT

Intelligent powered device (PD) control system including a switch system, state detector (SD), intelligent control device (ICD), and a PD. The switch system includes one or more conventional electrical switches. Each switch includes an interface to receive selection of a switch system state change between conductive and non-conductive states. The switch system includes a conductor pair(s) indicative of switch system state based on the selection. The SD signals the detected state to the ICD. The switch system output is in electrical connection with the detector such that, in the conductive state a loopback is formed in the switch system and SD, and in the non-conductive state no loopback is formed. The ICD receive the message from the state detector and transmits a fixture control command based on the message. The PD receives the command from the ICD via the data communications network, and controls its state based on the command.

25 Claims, 8 Drawing Sheets

700

Receive, by a conventional two-state electrical switch system, selection of a change of state between a conductive state and a non-conductive state of the switch system
710

Present, by the conventional two-state electrical switch system, each received switch system state at a state detector
720

Convert, by the state detector, the presented at least one switch system state to a signal in a data communications network
730

Communicate, by the data communications network, the signal to an intelligent control device
740

Translate, by the ICD, the communicated signal into a PD control command
750

Transmit, by the ICD via the data communications network, the PD control command to the PD via PSE in the data communication network
760

Change, by the PD, a state of the PD based on the transmitted PD device control command
770

FIG. 7

CONTROLLING INTELLIGENT POWERED DEVICES

TECHNICAL FIELD

The disclosed technology relates to intelligent electrical fixtures powered over a data network, and more particularly to controlling intelligent powered devices in such electrical fixtures using conventional electrical switches.

BACKGROUND

A typical discrete-state electrical switch is a manually operated, non-electronic, device that can make or break one or more electrical circuits (hereinafter "conventional switch"). Such conventional switches include switches with one or more sets of contacts that can be connected in residential or commercial building electrical circuits for on/off control of a fixture. Conventional switches typically include a mechanical interface, such as a toggle, for mechanical switching between conducting (on) and non-conducting (off) states of the electrical circuit. Fixtures can include lighting fixtures, electrical outlets, electro-mechanical machinery, and electronic devices.

Traditional light fixtures are controlled by modifying the current of electricity that is allowed to flow through the bulb or bulbs. This control is accomplished through an electrical on/off switch, with the most common implementation of either permitting or denying all of the available current to flow to the bulb. While this approach works well for filament bulbs, florescent bulbs, and even for some LED bulbs, it does not work well for intelligent lighting systems that are controlled via communications protocols.

BRIEF DESCRIPTION OF THE DRAWINGS

FIG. 7 is a block diagram depicting example methods for switching intelligent powered devices, in accordance with certain example embodiments.

DETAILED DESCRIPTION OF EXAMPLE EMBODIMENTS

Overview

Figure 1:
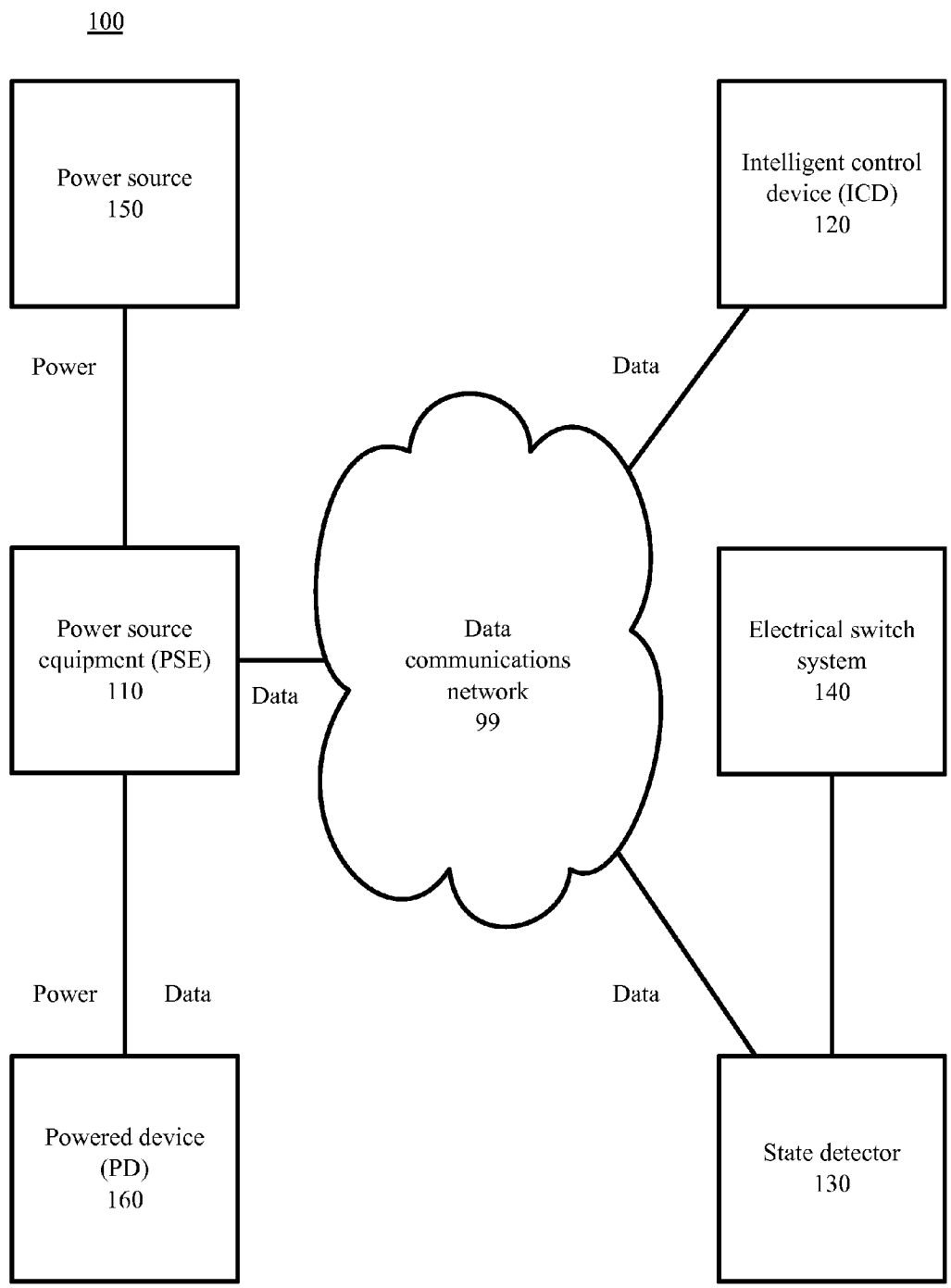
FIG. 1 is a block diagram depicting a communications, electrical power, and processing architecture for switching intelligent powered devices, in accordance with certain example embodiments.

The technology described herein includes systems, methods, and computer program products for controlling intelligent powered devices. Such a system includes a switch system, a state detector, an "intelligent controlling device" (ICD), and a "powered device" (PD). The switch system includes at least one conventional electrical switch. Each conventional electrical switch includes an interface operative to receive a manual selection of a state change between a conductive state and a non-conductive state of the switch system. The switch system includes a switch system output comprising at least one conductor pair indicative of the current state of the switch system based on the received selection of a state change.

The state detector is in electrical communication with the switch system output, and is operative to signal the detected switch system state via a data communications network. The switch system output is in mating electrical connection with the detector input such that in a switch system conductive state, a loopback connection is formed in the combined switch system and state detector, and in a switch system non-conductive state, a loopback connection is not formed in the combined switch system and state detector.

The ICD is in data communication with the state detector via the data communications network to receive the message transmitted from the state detector. The ICD transmits a fixture control command based on the received message. The PD receives the fixture control command from the intelligent control device via the data communications network. The PD controls its state based on the received fixture control command.

These and other aspects, objects, features, and advantages of the example embodiments will become apparent to those having ordinary skill in the art upon consideration of the following detailed description of illustrated example embodiments.

Example System Architectures

Power over Ethernet (PoE) is a technology that can pass both electrical power and data on Ethernet cabling, such as Category 5 (Cat 5) cabling. In PoE systems, power can be carried on the same conductors as the data, or it can be carried on dedicated conductors in the same cable. A PoE device, such as an Ethernet switch, that provides power via an Ethernet cable, is referred to as "power sourcing equipment" (PSE). A device, such as a light bulb or a wireless access point, that is supplied such power via an Ethernet cable is referred to as a "powered device" (PD). Multiple PDs, such as an ambient light detector, a smoke detector, and a camera, can be combined in a single PoE electrical fixture. A PD can use the Ethernet connection to receive control signals from, and send messages to, an "intelligent controlling device" (ICD). For example, a network-connected processor serving as an ICD can send a message over Cat 5 cable, through an Ethernet switch (serving as a PSE), to a Light Emitting Diode (LED) light (the PD) to change the color or intensity of light emitted by the PD.

Controlling an intelligent PD in PoE systems can be challenging. Using an intelligent switch, for example, a network-enabled programmable device, in each circuit can dramatically increase the cost of wiring a new building for PoE. For a building with existing conventional wiring, removing the conventional wiring and installing PoE wiring, such as Cat 5 cable, can be even more costly. On the other hand, using a conventional switch to directly control the power to the PDs in a multi-PD fixture, for example a fixture with a lighting PD and a smoke detector PD, would not be acceptable. Some PDs, such as the integrated smoke detector, require power even when the lighting PD is switched off.

Embodiments of the technology disclosed herein use a switch system of one or more conventional switches to signal a switch system state to a detector that then can communicate the switch system state to an ICD via a data network. The ICD can control each PD in an intelligent fixture of one or more PDs independently using messages over the data network through a PSE. Power is provided to the PD through the PSE.

Turning now to the drawings, in which like numerals represent like (but not necessarily identical) elements throughout the figures, example embodiments are described in detail.

Referring to FIG. 1, an example architecture 100 for switching for intelligent powered devices is illustrated. While each server, system, and device shown in the architecture is represented by one instance of the server, system, or device, multiple instances of each can be used. Further, while certain aspects of operation are presented in examples related to FIG. 1 to facilitate enablement of the example embodiments, additional features, also facilitating enablement of the example embodiments, are disclosed elsewhere herein.

As depicted in FIG. 1, the architecture 100 includes power source equipment (PSE) 110, intelligent control device (ICD) 120, and state detector 130, each of which may be configured to communicate with one another via data communications network 99, for example, an Ethernet network. FIG. 1 further illustrates a conventional switch system 140, a power source 150, and a powered device (PD) 160.

Network 99 includes one or more wired or wireless telecommunications mechanisms by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each device 110, 120, 130, and powered device 160 can include a communication module capable of transmitting and receiving data via the network 99. For example, each network device can include an intelligent device comprising one or more components, a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, a building operator may operate PSE 110, state detector 130, conventional switch system 140, power source 150, and PD 160. A building operator, or a lighting as a service (LaaS) provider may operate an ICD 120.

The network connections illustrated are examples, and other means of establishing a communications link between the computers and devices can be used. Additionally, those having ordinary skill in the art having the benefit of the present disclosure will appreciate that the network devices 110, 120, and 130, along with 160, illustrated in FIG. 1 may have any of several other suitable computer system configurations. For example, state detector 130 can be embodied as an Ethernet switch and may not include all the components described above, or can be embodied within PSE 110.

One advantage of certain embodiments of the disclosed technology is that a conventional switch can be placed at an expected location in a room, rather than requiring a user to understand and use a new type of switch in an unexpected location, while retaining the benefits of intelligent fixtures and an intelligent control device.

In some embodiments, a PD 160 in a multi-PD intelligent fixture is powered by PoE from power source 150 via an Ethernet switch acting as a PSE 110, and controlled via a control protocol from an IDC 120. In some such embodiments, the Ethernet switch also acts as the state detector 130 by detecting the presence or absence of an Ethernet loopback condition on one port of the Ethernet switch. The ICD can read the presence or absence of an Ethernet loopback at that port via data communications network 99 between the PSE 110 and the ICD 120. In other such embodiments, the multi-PD intelligent fixture houses the state detector 130 Ethernet port. The state detector 130 Ethernet port is connected to a conventional switch system 140 for creation of the Ethernet loopback/no loopback.

In a new installation, installers can run an Ethernet cable from an Intermediate Data Frame (IDF) room, or a Main Distribution Frame (MDF) room, to power and control the PD 160 in the multi-PD intelligent fixture. The IDF room can contain the IDC 120, the power source 150, and the PSE 110, while the PD 160, state detector 130, and conventional switch system 140 can be contained in a room, for example, a conference room. An Ethernet cable can run from the intelligent fixture containing the PD 160 to a wall-mounted conventional double pole single throw (DPST) electrical switch in the conference room acting as the conventional switch system 140. In this case, when a person walks into a room and turns the electrical switch to "on", the Ethernet switch PSE 110 presents a loopback condition signaling to the ICD 120 that the PD 160 should be activated. When the DPST electrical switch is turned to the "off" position, the ICD 120 notices that the port is no longer in loopback mode and signals to the PD 160 to deactivate. In some embodiments, multiple PDs 160 across various fixtures, for example multiple light fixtures in a large conference room, can be so controlled.

Given such an architecture, the conventional switch system 140 can be connected to an Ethernet port state detector 130 at any point in communication with the data communication network 99, as long as the ICD 120 can monitor the port for the presence or absence of a loopback condition.

Illustrated Example Embodiments

The example embodiments illustrated in the following figures are described hereinafter with respect to the components of the example operating environment and example architecture described elsewhere herein. The example embodiments may also be practiced with other systems and in other environments.

Continuing to refer to FIG. 1, in some embodiments, the disclosed technology includes an electrical switch system 140. The switch system 140 includes one or more conventional electrical switches. Each conventional switch includes an interface operative to receive a manual selection of a state change between a conductive state and a non-conductive state of the switch system 140. As a continuing example, consider two residential single pole double throw (SPDT) toggle switches, also known as "three-way switches," mounted adjacent separate entrances to a room.

The switch system 140 outputs includes at least one conductive pair indicative of the current state of the switch system 140 based on the received selection of a state change. In the continuing example, one leg of the first SPDT switch is wired to one leg of the second SPDT switch, and the other leg of the first SPDT switch is wired to the other leg of the second SPDT switch, while conductors from the common contacts of the first and second SPDT switches form the conductive pair indicative of the current state of the switch system 140.

A state detector 130 is in electrical communication with the switch system 140 outputs. The state detector 130 is operative to signal a switch system 140 state via a data communications network 99. The switch system 140 output is in mating electrical connection with the state detector 130 input such that in a switch system 140 conductive state a loopback connection is formed in the combined switch system 140 and the state detector 130, and in a switch system 140 non-conductive state a loopback connection is not formed in the combined switch system 130 and state detector 130. A loopback formed, and no loopback formed, signal the conductive and non-conductive states of the switch system 140, respectively.

An intelligent control device 120 is in data communication, via the data communications network 99, with the state detector 130 to receive the signal transmitted from the state detector 130. The intelligent control device 120 transmits a powered device control command based on the received message.

A PD 160 is operative to receive the powered device control command from the intelligent control device 120 via the data communications network 99. The powered device 160 is operative to control its state based on the received powered device control command. The powered device 160 obtains power via power source equipment (PSE) 110 over conductors of the data network.

Figure 2:
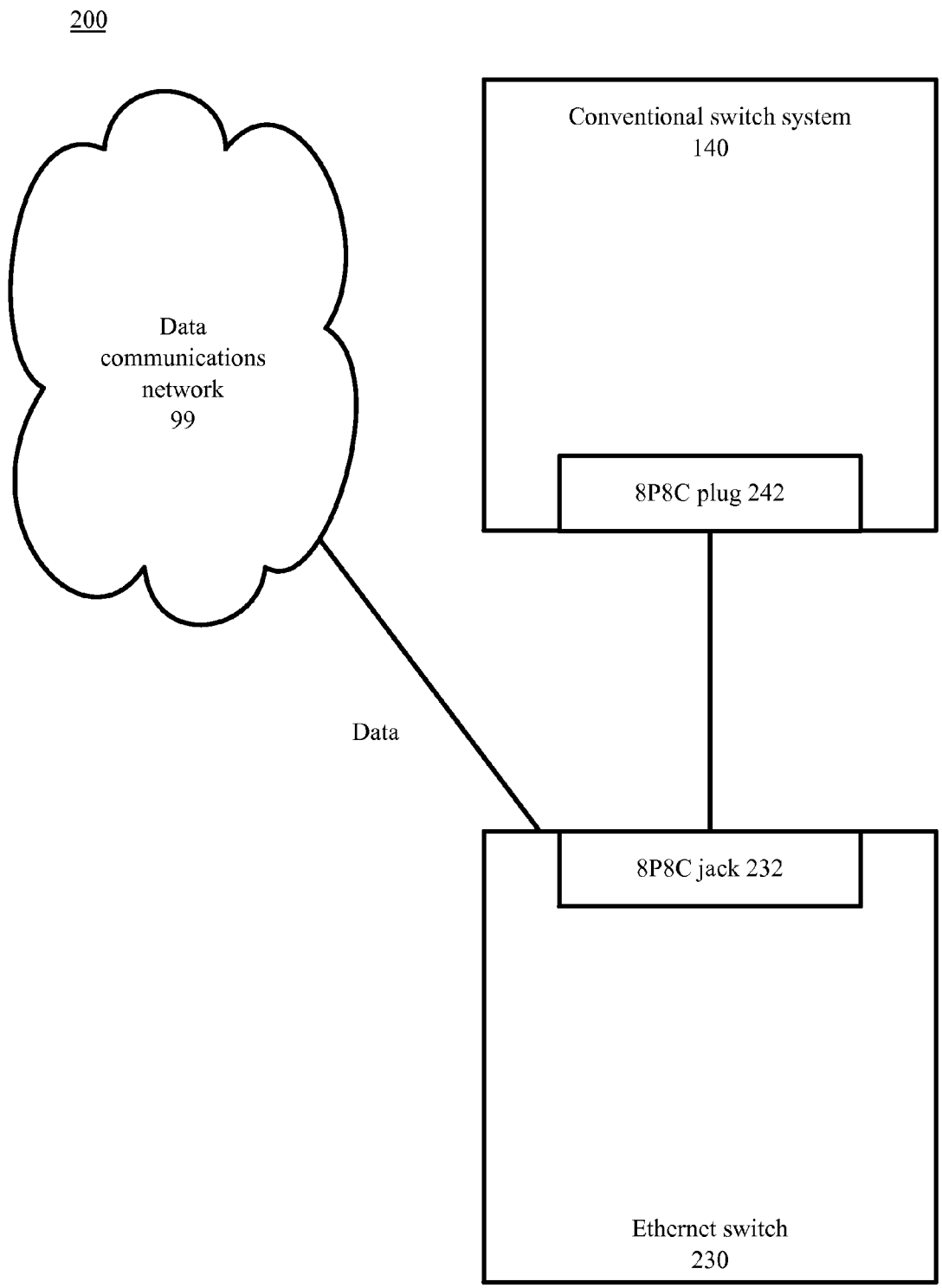
FIG. 2 is a block diagram depicting a communications, electrical power, and processing architecture for switching intelligent powered devices, in accordance with certain example embodiments.

Referring to FIG. 2, and continuing to refer to FIG. 1 for context, an example system 200 for controlling intelligent powered devices is illustrated. In such systems, elements PSE 110, ICD 120, and PD 160, and power source 150 (each not shown), along with data communications network 99 are configured and operate as described elsewhere herein. In such systems, the state detector 130 is an Ethernet switch 230. For example, a port of a layer 2 or a layer 3 switch can be used. The port in such embodiments includes an 8P8C jack 232. The 8P8C jack 232 is the female portion of an 8P8C connector. The 8P8C connector is a modular connector commonly used to terminate twisted pair and multiconductor flat cable in Ethernet applications. 8P8C connectors often are referred to as "RJ45" connectors. In such embodiments, the switch system output is embodied in an 8P8C plug 242. The loopback formed in the combined switch system and state detector when the switch system 140 is in the conductive state is an Ethernet loopback. The presence of an Ethernet loopback at a specific port of the Ethernet switch 230 can create a signal in the data communications network 99 that indicates to the IDC 120 that the switch system 140 is in a conductive state. Other PDs 160 in what could be a multi-PD intelligent fixture can continue to be powered through the power source 150 and the PSE 110.

Figure 3:
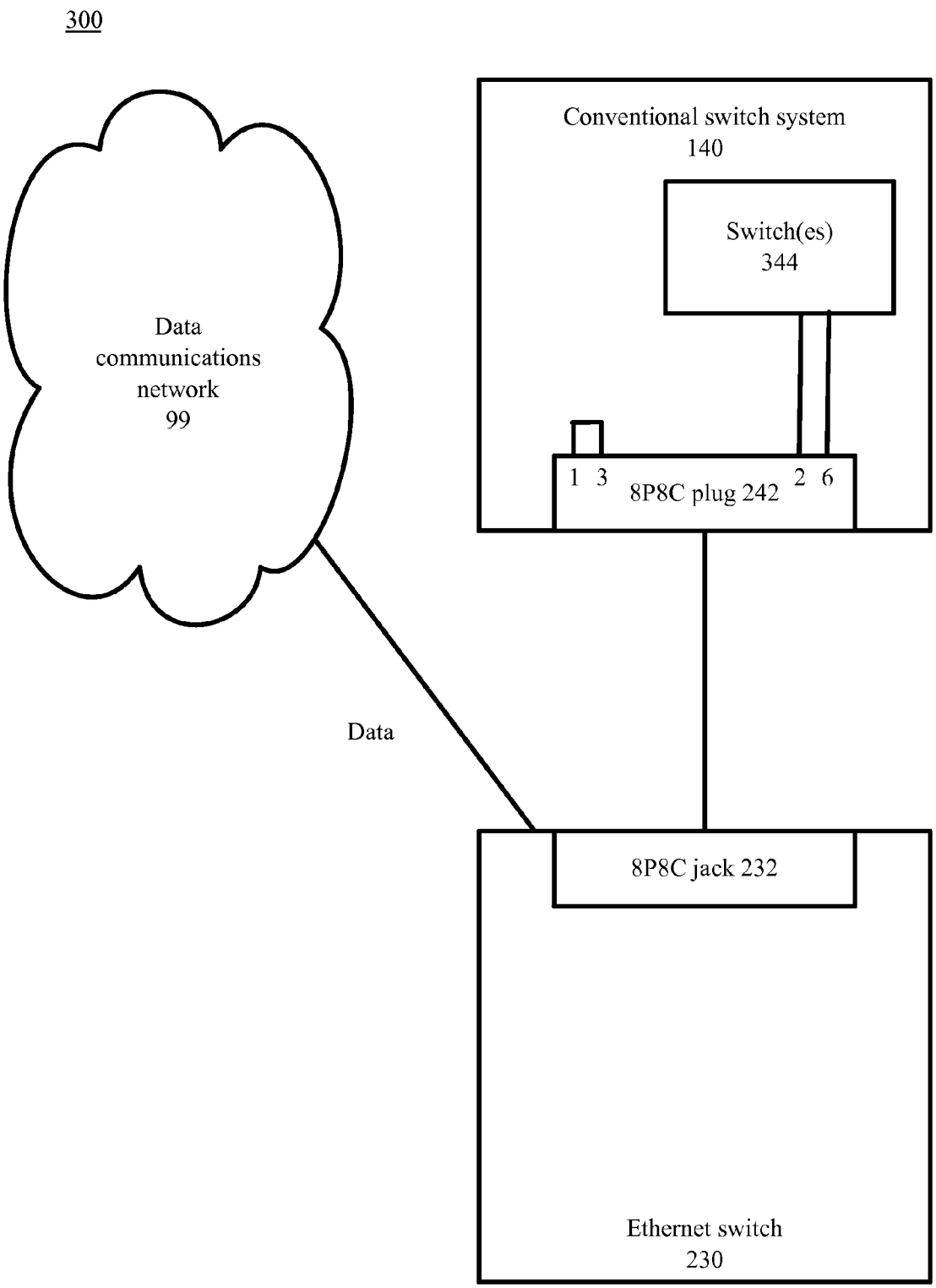
FIG. 3 is a block diagram depicting a communications, electrical power, and processing architecture for switching intelligent powered devices, in accordance with certain example embodiments.

Referring to FIG. 3, and continuing to refer to prior figures, an example system 300 for controlling intelligent powered devices is illustrated. In such systems, PSE 110, ICD 120, power source 150, and PD 160 (each not shown), along with Ethernet switch 230, 8P8C jack 232, 8P8C plug 242, and data communications network 99 are configured and operate as described elsewhere herein. In such systems, the 8P8C plug 242 includes a short circuit between one of the pairs {pin1, pin3} and {pin2, pin6} of the 8P8C plug 242. The other of the pairs {pin1, pin3} and {pin2, pin6} of the 8P8C plug 242 includes a conductor pair indicative of the current state of the switch system based on the received selection of a state change.

Ethernet connections using Cat 5 cable employ balanced line twisted pair design and use differential signaling for noise rejection. In this design, a data signal is determined not by the voltage from a single conductor to ground, but by the voltage between two conductors. In an Ethernet loopback, a first conductive path exists between conductor 1 (transceive data +) and conductor 3 (receive data +), and a second conductive path exists between conductor 2 (transceive data −) and conductor 6 (receive data −). Any data sent out on a looped back port on the differential {conductor 1, conductor 2} will return to the port on the differential pair {conductor 3, conductor 6). Breaking either conductive path will break the loopback. In the embodiment illustrated in FIG. 3, the output from switches 344 includes only two (2) conductors connected to the 8P8C plug 242. The output from switches 344 is used to make or break the conductive path between pin2 and pin6 of the 8p8C plug 242.

Consider as an example, a set of three switches 344, two SPDT switches and one intermediate four-way switch, wired together to allow any one switch to change the state of the switch system from conducting to non-conducting. Such a switch configuration is common in residential and commercial wiring. The two-conductor output of such a set of switches 344 can be connected to either {pin2, pin6} or {pin1, pin3}, while the other of {pin2, pin6} and {pin1, pin3} is short-circuited. Use of existing wiring can reduce the cost of introducing intelligent PDs to a building, and can allow the introduction of intelligent PDs to be mostly transparent to end users, in part because the existing switches remain in place and operable.

Figure 4:
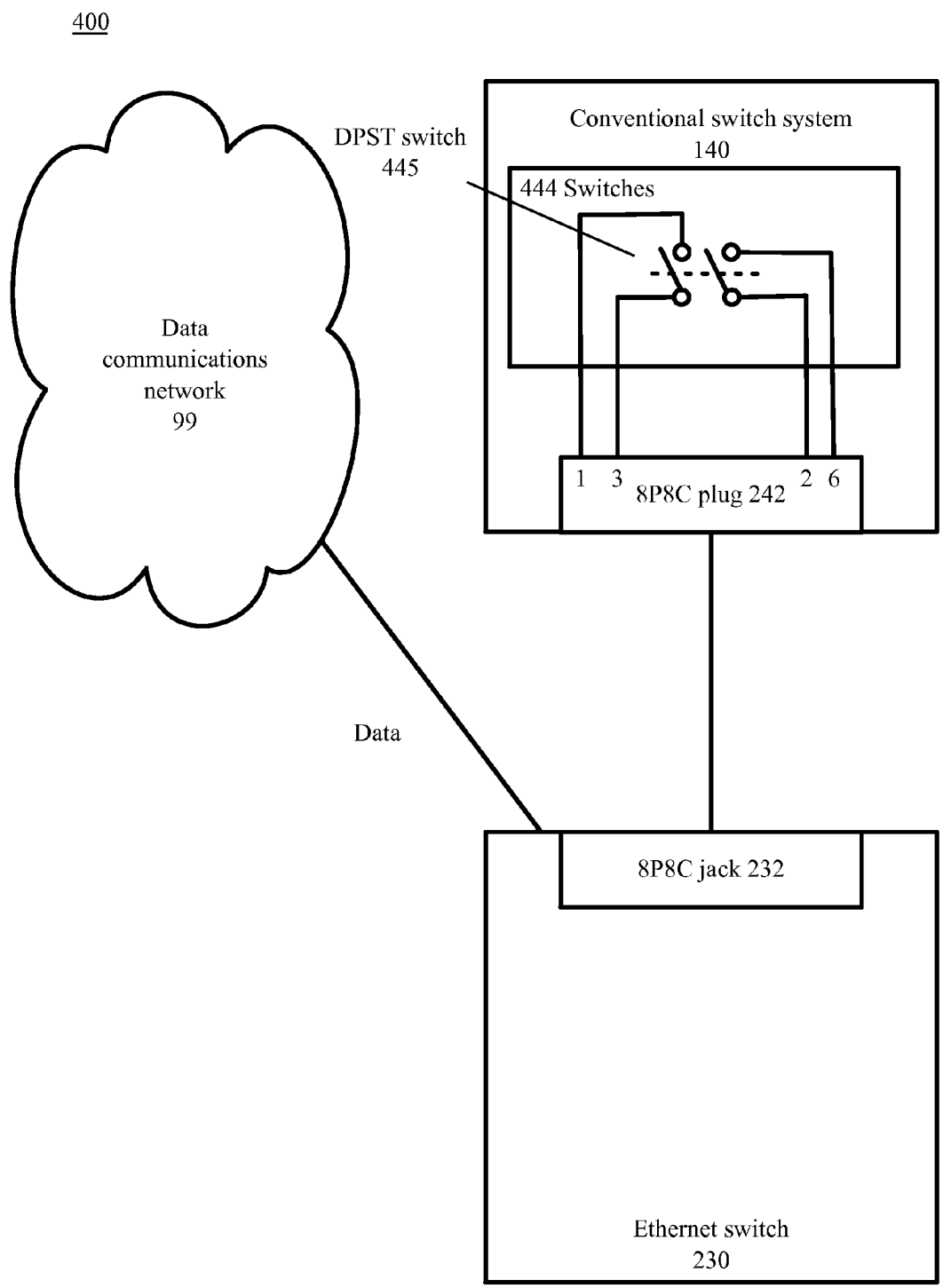
FIG. 4 is a block diagram depicting a communications, electrical power, and processing architecture for switching intelligent powered devices, in accordance with certain example embodiments.

Referring to FIG. 4, and continuing to refer to prior figures, an example system 400 for controlling intelligent powered devices is illustrated. In such systems, PSE 110, ICD 120, power source 150, and PD 160 (each not shown), along with Ethernet switch 230, 8P8C jack 232, 8P8C plug 242, and data communications network 99 are configured and operate as described elsewhere herein. In such systems, the switch system 444 includes a Double Pole Single Throw (DPST) switch 445 connected to Category 5 cable and terminating in the 8P8C plug 242. The DPST switch is wired with the Category 5 cable forming a conductive path between pin1 and pin3 of the 8P8C plug on one pole, and between pin2 and pin6 of the 8P8C plug on the other pole, when the contacts of the DPST switch are closed. In this case, both sets of transceive and receive connections in the 8P8C plug are switched. Rather than use Cat 5 cable between the switches 444 and the plug, conventional building wiring (for example, wiring already installed in the building) can be used with a proper adapter for physical interface with the 8P8C plug 242.

Figure 5:
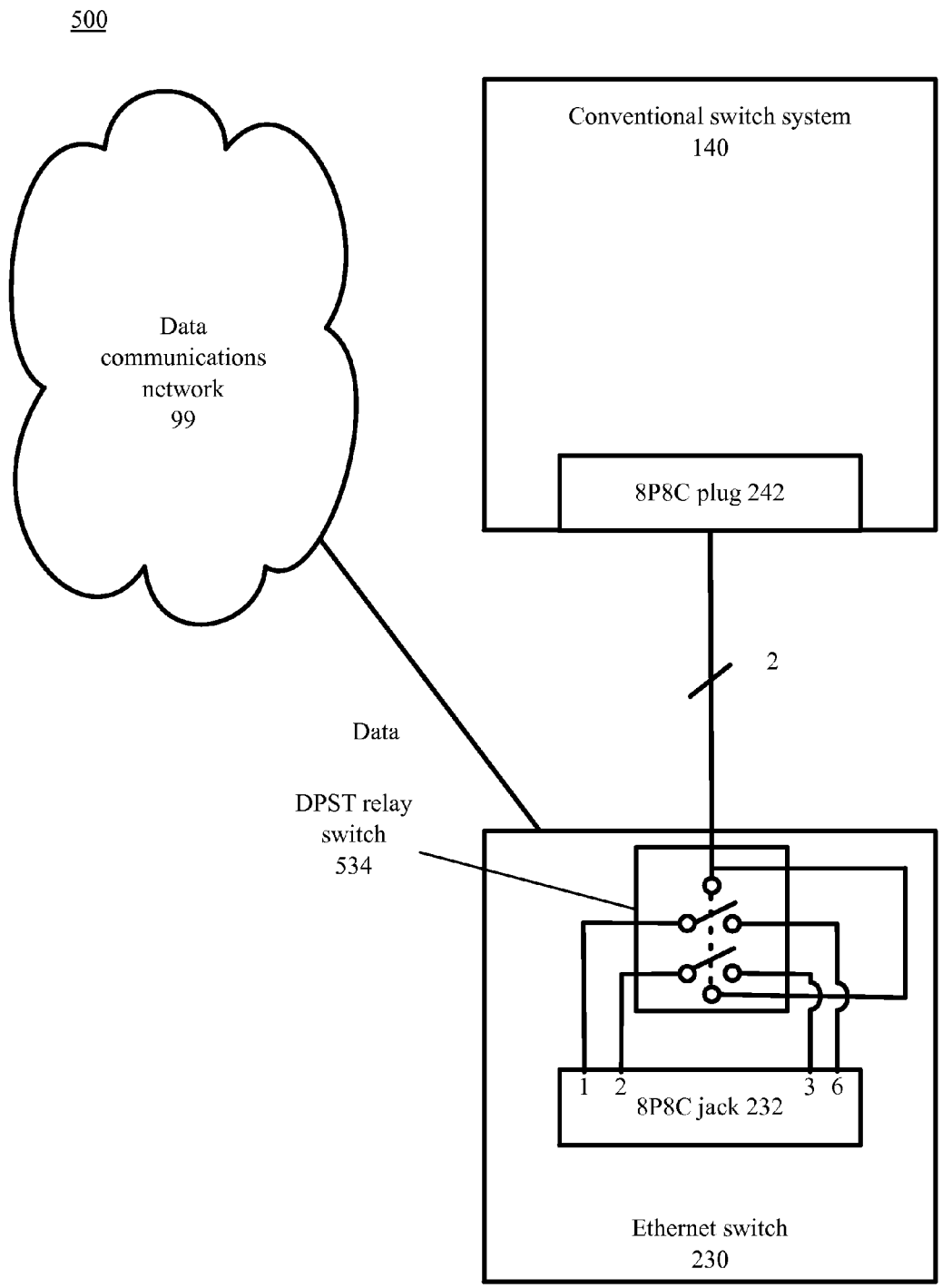
FIG. 5 is a block diagram depicting a communications, electrical power, and processing architecture for switching intelligent powered devices, in accordance with certain example embodiments.

Referring to FIG. 5, and continuing to refer to prior figures, an example system 500 for controlling intelligent powered devices is illustrated. In such systems, PSE 110, ICD 120, power source 150, and PD 160 (each not shown), along with conventional switch system 140, Ethernet switch 230, 8P8C jack 232, 8P8C plug 242, and data communications network 99 are configured and operate as described elsewhere herein. In such example embodiments, the switch system output consists of a single pair of conductors indicating a conducting or non-conducting state of the conventional switch system 140. At the Ethernet switch 230, a DPST relay switch is included that can detect a conductive state across the pair of conductors from the conventional switch system, and replicate that state across the 8P8C jack pins to form an Ethernet loopback.

Figure 6:
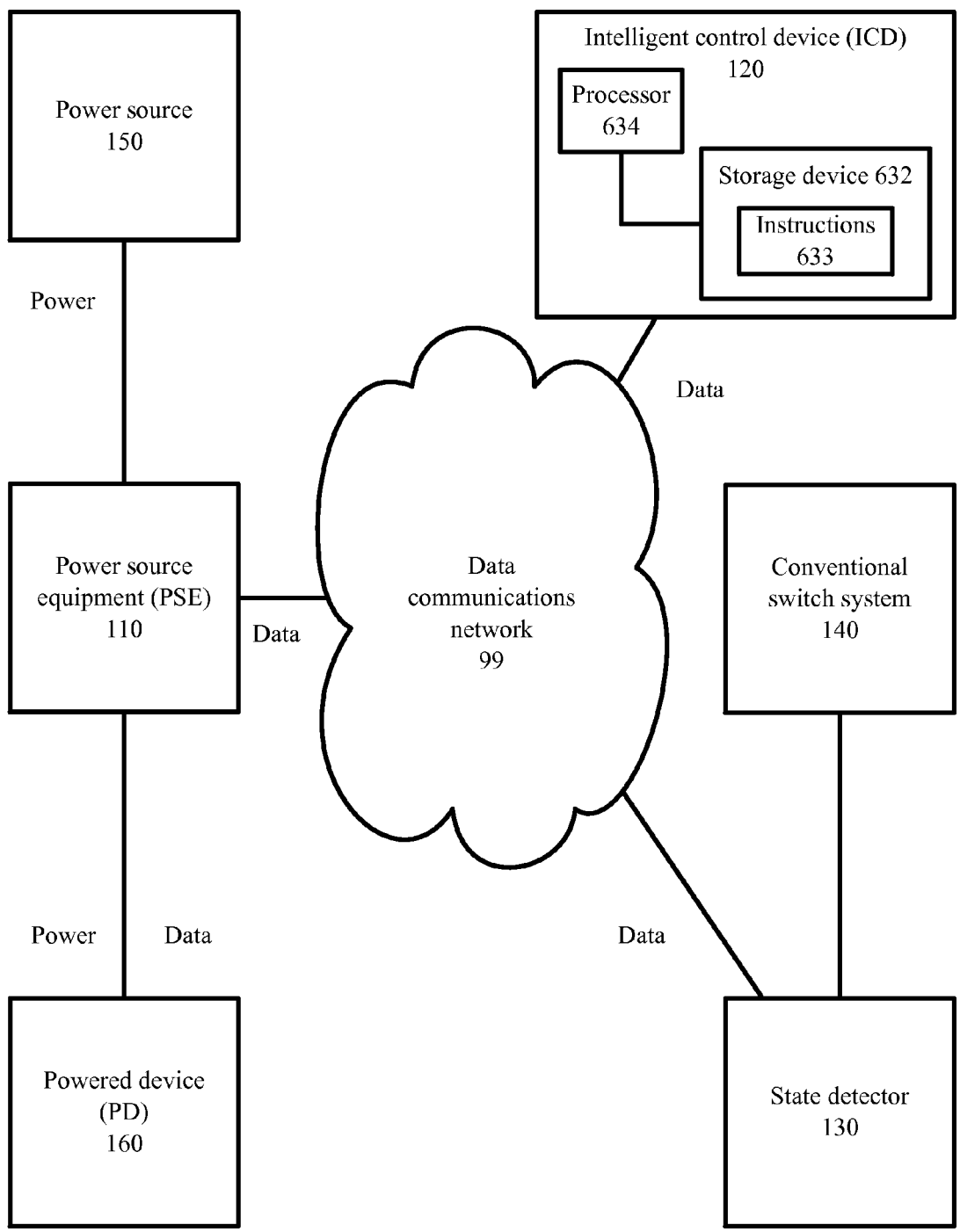
FIG. 6 is a block diagram depicting a communications, electrical power, and processing architecture for switching intelligent powered devices, in accordance with certain example embodiments.

Referring to FIG. 6, and continuing to refer to prior figures, an example system 600 for controlling intelligent powered devices is illustrated. In such systems, data communications network 99, PSE 110, ICD 120, state detector 130, conventional switch system 140, power source 150, and PD 160 are configured and operate as described elsewhere herein. In such embodiments, the ICD 120 includes a storage device 632 and a processor 634. The processor 634 is communicatively coupled to the storage device 632. The processor 634 executes application code instructions 633 that are stored in the storage device 632 and that cause the ICD 120 to receive the message regarding the conducting/non-conducting state of the conventional switch system 140 transmitted from the state detector 130. Execution of the application code instructions 633 by the processor 634 then translate the received message into a fixture control command, and transmit the fixture control command to the powered device 160 via the communications network 99 and the PSE 110.

Consider as an example, application code instructions 633 that cause the ICD 120 to translate a pattern of state changes over time into a fixture control command. In such embodiments, more than two states can be mapped to state change patterns over time from a two-state switch system 140. For example, a sequence of rapid toggles can be mapped to increased light intensity at the PD, while a sequence of toggles separated by more than one (1) second, can be mapped to decreased light intensity at the PD 160, or vice versa. In general, translating the signal over time a command to control the fixture of the powered device can include translating a signal below a threshold frequency of state changes to a dimming powered device control command, and translating a signal at or above a threshold frequency of state changed to a brightening powered device control command.

Referring to FIG. 7, and continuing to refer to prior figures, an example method 700 for intelligent powered device control is illustrated. A conventional two-state electrical switch system 140 can receive a selection of a change of state between a conductive state and a non-conductive state of the switch system—Block 710. For example, a user may enter a room and toggle the single pole single throw (SPST) switch typically present just inside the doorway to the room.

The conventional two-state electrical switch system 140 presents each received switch system state at a state detector 130—Block 720. Continuing with the present example, the SPST switch is wired to Cat 5 cable to a port of an Ethernet switch 230 acting as a state detector 130. The state detector 130 converts the presented switch system state to a signal in a data communications network—Block 730. In the present example, the Ethernet switch 230 interprets conduction across the two conductors of the SPST switch as an Ethernet loopback.

The signal is communicated from the state detector 130 over the data communications network 99 to an intelligent control device 120—Block 740. In the present example, the Ethernet switch 230 presents a loopback on the port connected to the switch system 140 when the switch system 140 is in the conducting state, and no loopback when the switch system 140 is in the non-conducting state. The ICD 120 translates the communicated signal to a powered device control command—Block 750. In the continuing example, the ICD 120 translates an Ethernet loopback to an "on" command, and no Ethernet loopback to an "off" command.

The ICD 120 then transmits, via the data communications network 99, the powered device control command to the PD 160 via the PSE 110 and the data communication network 99—Block 760. In the continuing example, the ICD 120 transmits a message in the protocol used in a PoE network for turning on or off a PD 160. The PD 160 changes its state based on the transmitted/received powered device control command—Block 770.

In some embodiments, receiving a selection of a change of state between a conductive state and a non-conductive state of the switch system 140 includes receiving a series of switch system states over a time period. In such embodiments, the state detector 130 is an Ethernet switch 230 that converts the series of switch system states to a signal over time in the Ethernet network joining the Ethernet switch 230 and the ICD 120. The ICD 120 then translates the communicated signal to a powered device control command. The use of a signal over time allows the system to control more than two states of a PD 160.

Other Example Embodiments

Figure 8:
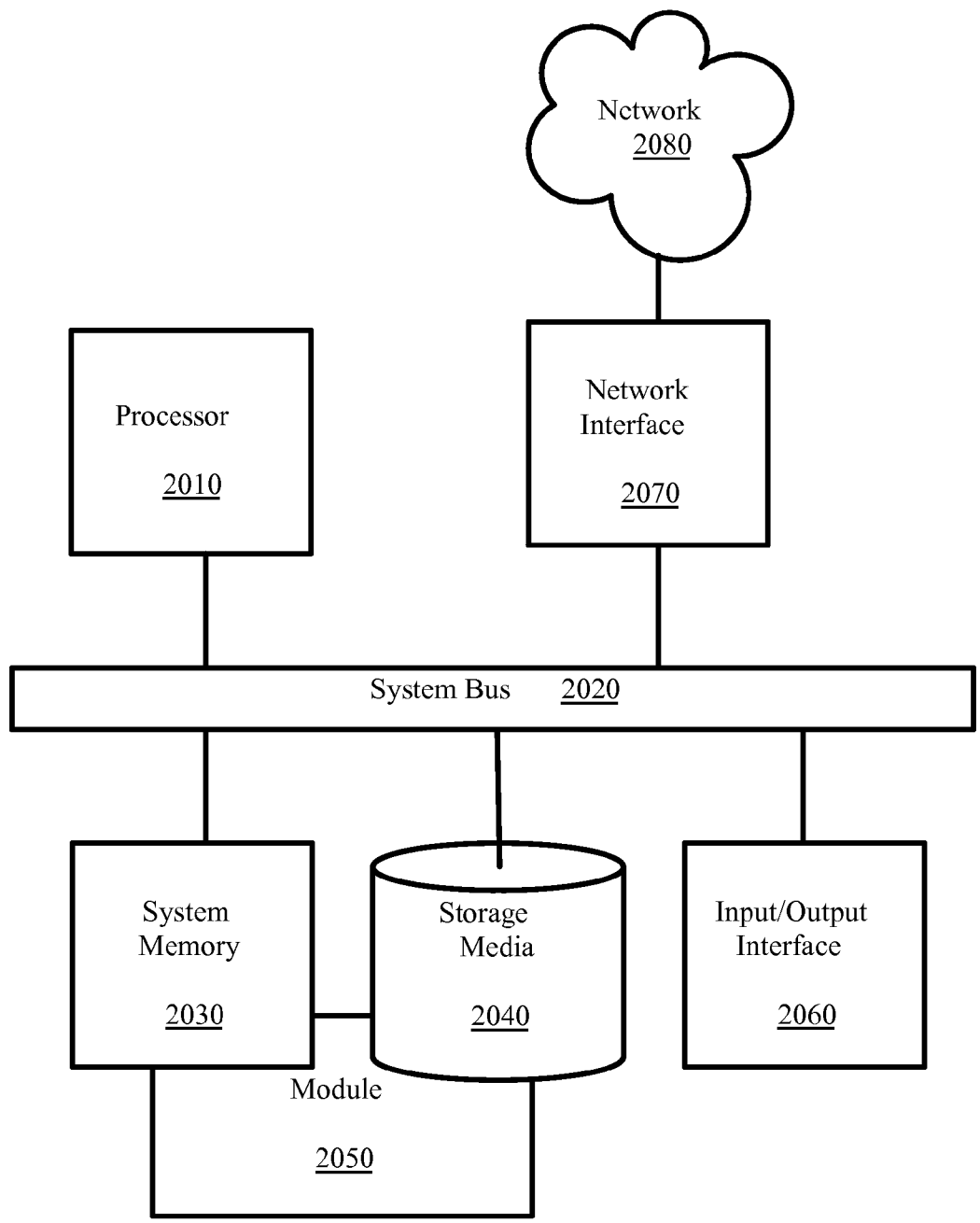
FIG. 8 is a diagram depicting a computing machine and a module, in accordance with certain example embodiments.

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. For example, the technology can be adapted to dimmer switches and switches with more than two states (either discrete or continuous) through the use if a relay switch at the state detector.

Consider that there may be a delay between when a conventional electrical switch is thrown and when the light or lights will be activated in example embodiments of the present technology. This will depend upon how quickly the state of the Ethernet port is detected and then how quickly that information can be transmitted and acted upon. In some example embodiments, this will be somewhat like changing the channel for IP-based television; there will be a noticeable delay but over time the technology will catch up to consumer's expectations.

Consider a single conventional light fixture. In such a fixture a single pole single throw electrical switch can be used to indicate that the light should go on or off. A pair of wires are string from the light fixture to the electrical switch and would be wired to two contact points at the light fixture. When the light fixture detected that the two contacts were electronically in contact with each other it would determine that the light should go "on". Then when it detected that the contacts were not in electrical contact with each other, then the light should go "off". This is architecturally limiting in that specific contact points would be designated for this purpose, whereas in example embodiments of the present technology, any Ethernet port throughout the building could be designated as the interface to activate or deactivate any light or group of lights.

Consider other ways to activate and deactivate lights in a building. A state detector could indicate which set of lights should be activated, control on an IP phone in a room. The state detector could be a facial recognition state detector or a detector for detecting the location of a smart phone or other device.

In some example embodiments, the Ethernet switch would not associate a loopback with "on" and no loopback with "off", but rather a change in state indicates that the lights need to be placed in the other state. For example, if both electrical switches were in the "on" positions and a loopback condition was enabled on the Ethernet switch, the initial state of the light fixture may be "off". Then when either electrical switch was changed to the "off" position, the Ethernet switch would notice this and send a message to the controller indicating that change. The controller would then change the state of the light fixture.

Use of a programmable device at the switch plate to signal user expectations to a controller that would then control the lights. Using such a device could be expensive, and pose a security threat as the device would be available to the public and could be hacked to perform actions outside the policies of the rightful owners. A simple on/off switch cannot be hacked in that way.

In traditional use, the use of a switch has been ingrained into everyone in this generation; if a light is off, switch the switch to the other position and it should come on. Within the current and recently past generations, this is a natural expectation. In the uses of the present technology, since the switch is now converted to a data signal rather than a fixed control, new options are available. These algorithms can be published to educate people in their new use. For example, quickly toggling a conventional on/off switch will flash an incandescent light on and off.

In some example embodiments of the present technology, rapid toggling of a switch could lead to new options such as to signal an emergency condition. A specific example of a new algorithm would be in an office floor. Currently, a switch will only control a section of the lights on a typical office floor. In example embodiments, the present technology can be configured to control a section of lights when toggled once. However, rapidly toggling the switch could be a signal to immediately light the entire floor. This may be desired for safety and security reasons.

Customers installing an lighting solution embodying the present technology can cut their costs by using this over other forms of lighting, in part because the wiring can be less expensive that traditional wiring, and does not need to be installed by an electrician. Similarly, the installation of a simple on/off switch is of a much lower price than the installation of programmable device that will incur an additional operations expense of needing to be programmed.

In some example embodiments, a rapid toggling could be programmed for specific results. Similarly, a slow toggling could be programmed onto the controller to provide a different action. One example of this could be to exploit the dimability of LED lights. An initial toggle of the switch would bring the lights up to full strength. A subsequent toggle within a second or two, would then dim them by 20% with additional toggles reducing the brightness by additional incremental 20%. If no toggles are detected within 3 seconds (as an example) any subsequent toggles would turn the lights to the off position.

Having single-purpose devices such as conventional switches exposed to the public (the on/off switch) represents less of a security threat than having programmable devices exposed. Further, it could be much more cost effective and secure to provide a backup power source (battery and generator) for Ethernet switches that can provide lighting, than to do the same for the entire current lighting system throughout their facility. Expanding upon that, there is a danger in the current use of 120 or 220 volt wiring (Alternating Current). When the cover plate is removed to an on/off switch there is a danger of electrocution if the current is still available to the on/off switch. This danger would be vastly reduced with only low-voltage Ethernet wiring going to that on/off switch.

An intelligent light fixture can be powered by PoE from an Ethernet switch and controlled via an LaaS protocol. Adding other components to the fixture can be done via another Ethernet switch built into the fixture and those components communicate upstream via the LaaS protocol. The fixture (in some embodiments, incorporating a detector) can detect that one of the ports is in loopback and relay that information (also via the LaaS protocol) to the upstream Ethernet switch. That Ethernet switch then relays that information to a ICD. The ICD recognizes that the information relayed to it means that the light fixture should be activated and the lights turned on. That sequence would also be done via the LaaS protocol.

In some room installations of the present technology, installers run the Ethernet cable from the IDF room to power and control the ceiling fixture. An additional Ethernet cable is run from the fixture to the wall plate. The electrical switch (double pole single throw) is connected as described before. In this case, when a person walked into a room and turned the electrical switch to "on", the Ethernet switch in the fixture detects a loopback and signals (via the LaaS protocol) that the fixture should be activated. When the electrical switch is turned to the "off" position, the Ethernet switch notices that the port is no longer in loopback mode and signals that via the LaaS protocol to the upstream Ethernet switch.

In other example embodiments, for a large room within a building, such as an amphitheater or an area filled with cubicles, there will be multiple fixtures and an electrical switch on a wall could be directly attached to an Ethernet switch in the IDF or MDF.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
   receiving, by an intelligent control device via a data communications network, an Ethernet loopback signal representing a state change between a conductive state and a nonconductive state of a conventional two-state electrical switch system;
   translating, by the intelligent control device, the received signal into a powered device control command; and
   transmitting, by the intelligent control device via the data communications network, the powered device control command to the powered device via power source equipment in the data communication network.

2. The method of claim 1, further comprising changing, by the powered device, a state of the powered device based on the transmitted powered device control command.

3. The method of claim 1,
   wherein the data communications network comprises an Ethernet network;
   wherein the received signal is translated into a powered device control command by:
      translating the Ethernet loop-back into a command to turn on a fixture of the powered device, and
      translating an open circuit into a command to turn off the fixture of the powered device.

4. The method of claim 3,
   wherein the change of state between a conductive state and a non-conductive state of the switch system comprises a series of switch system states over a time period;
   wherein translating the communicated signal to a powered device control command comprises translating the signal over time into a command to control the fixture of the powered device.

5. The method of claim 4, wherein translating the signal over time a command to control the fixture of the powered device comprises:
   translating a signal below a threshold frequency of state changes to a dimming powered device control command; and
   translating a signal at or above a threshold frequency of state changed to a brightening powered device control command.

6. A system, comprising:
   a switch system comprising at least one conventional electrical switch, each conventional electrical switch comprising an interface that receives a manual selection of a state change between a conductive state and a non-conductive state of the switch system, and
   comprising a switch system output comprising at least one conductor pair indicative of the current state of the switch system based on the received selection of a state change;
   a state detector in electrical communication with the switch system output, and that signals the detected switch system state via a data communications network;
   a intelligent control device in data communication with the state detector via the data communications network to receive the message transmitted from the state detector, and that transmits a fixture control command based on the received message; and
   a powered device that receives the fixture control command from the intelligent control device via the data communications network, and that controls a state of the powered device based on the received fixture control command, wherein the switch system output is in mating electrical
connection with the detector input such that:
in the switch system conductive state, an Ethernet
loopback connection is formed in the combined
switch system and state detector, and
in the switch system non-conductive state, an Ethernet
loopback connection is not formed in the combined
switch system and state detector.

7. The system of claim 6, wherein the intelligent control device comprises:
wherein the data communications network comprises an Ethernet network; and
wherein the received signal is translated into a powered device control command by:
translating the Ethernet loopback into a command to turn on a fixture of the powered device, and translating an open circuit into a command to turn off the fixture of the powered device.

8. The system of claim 7, wherein:
the switch system output comprises an 8P8C plug; and
the state detector is an Ethernet switch, and the state detector input comprises an 8P8C jack.

9. The system of claim 7, wherein:
the 8P8C plug comprises a short circuit between one of the pairs {pin1, pin3} and {pin2, pin6} of the 8P8C plug, and the other of the pairs {pin1, pin3} and {pin2, pin6} of the 8P8C plug comprises the at least one conductor pair indicative of the current state of the switch system based on the received selection of a state change.

10. The system of claim 7, wherein:
the switch system comprises a Double Pole Single Throw (DPST) switch connected to Category 5 cable and terminating in the 8P8C plug, and
the DPST switch is wired the Category 5 cable forming a conductive path between pin1 and pin3 of the 8P8C plug on one pole, and between pin2 and pin6 of the 8P8C plug on the other pole, when the contacts of the DPST switch are closed.

11. The system of claim 7, wherein:
the switch system comprises a Double Pole Single Throw (DPST) switch connected to building electrical cable and terminating in the 8P8C plug, and the DPST switch is wired the building electrical cable to create a conductive path between pin1 and pin3 of the 8P8C plug on one pole, and between pin2 and pin6 of the 8P8C plug on the other pole, when the contacts of the DPST switch are closed.

12. The system of claim 7, wherein:
the switch system output comprises a single pair of conductors,
the state detector input comprises a double pole single throw (DPST) relay switch,
and responsive to change state upon a state change of the switch system electrical switch.

13. The system of claim 7, wherein the Ethernet switch is located in one of an Intermediate Distribution Frame (IDF) of a building data communications network and a Main Distribution Frame (MDF) of a building data communications network.

14. The system of claim 6, wherein the intelligent control device comprises:
a storage device; and
a processor communicatively coupled to the storage device, wherein the processor executes application code instructions that are stored in the storage device and that cause the LED to:

receive the message transmitted from the state detector,
translate the received message into a fixture control command, and
transmit the fixture control command to the electrical fixture.

15. The electrical system of claim 14, wherein the application code instructions that cause the leD to translate the received message into a fixture control command comprise application code instructions that cause the leD to translate the received message state change patterns over time into a fixture control command.

16. The electrical system of claim 6, wherein the detector is part of one of the power source equipment, the powered device, and the intelligent control device.

17. A method, comprising:
receiving, by a two-state electrical switch system, at least one selection of a change of state between a conductive state and a non-conductive state of the switch system as establishing and disestablishing, respectively, an Ethernet loopback;
presenting, by the conventional two-state electrical switch system, each received switch system state at a state detector;
converting, by the state detector, the presented at least one switch system state to a signal in a data communications network;
communicating, by the data communications network, the signal to an intelligent control device;
translating, by the intelligent control device, the communicated signal to a powered device control command;
transmitting, by the intelligent control device via the data communications network, the powered device control command to the powered device via power source equipment in the data communication network; and
changing, by the powered device, a state of the powered device based on the transmitted powered device control command.

18. The method of claim 17,
wherein translating the communicated signal to a powered device control command comprises:
translating the Ethernet loop back into a command to turn on a fixture of the powered device, and
translating an open circuit into a command to turn off the fixture of the powered device.

19. The method of claim 17,
wherein receiving at least one selection of a change of state between a conductive state and a non-conductive state of the switch system comprises receiving a series of switch system states over a time period;
wherein converting the presented at least one switch system state to a signal in a data communications network comprises converting the series of switch system states to a signal
over time in a data communications network;
wherein the data communications network comprises an Ethernet network;
wherein communicating the signal to an intelligent control device comprises communicating the signal over time via the Ethernet network, and
wherein translating the communicated signal to a powered device control command comprises translating the signal over time a command to control the fixture of the powered device.

20. The method of claim 19,
wherein translating the signal over time a command to control the fixture of the powered device comprises:

translating a signal below a threshold frequency of state changes to a dimming powered device control command; and translating a signal at or above a threshold frequency of state changed to a brightening powered device control command.

21. A system, comprising:

means for receiving, by an intelligent control device via a data communications network, a data communications signal representing a state change between a conductive state and a non-conductive state of a conventional two-state electrical switch system as establishing and disestablishing, respectively, an Ethernet loopback;

means for translating, by the intelligent control device, the received signal into a powered device control command;

means for transmitting, by the intelligent control device via the data communications network, the powered device control command to the powered device via power source equipment in the data communication network.

22. The method of claim 21, further comprising means for changing, by the powered device, a state of the powered device based on the transmitted powered device control command.

23. The system of claim 22, wherein means for translating the received signal into a powered device control command comprises:

means for translating the Ethernet loopback into a command to turn on a fixture of the powered device, and means for translating an open circuit into a command to turn off the fixture of the powered device.

24. The system of claim 23, wherein the change of state between a conductive state and a non-conductive state of the switch system comprises a series of switch system states over a time period;

wherein means for translating the communicated signal to a powered device control command comprises means for translating the signal over time into a command to control the fixture of the powered device.

25. The system of claim 24, wherein means for translating the signal over time a command to control the fixture of the powered device comprises:

means for translating a signal below a threshold frequency of state changes to a dimming powered device control command; and means for translating a signal at or above a threshold frequency of state changed to a brightening powered device control command.

* * * * *